United States Patent [19]
Silberman et al.

[11] Patent Number: 6,088,763
[45] Date of Patent: Jul. 11, 2000

[54] METHOD AND APPARATUS FOR TRANSLATING AN EFFECTIVE ADDRESS TO A REAL ADDRESS WITHIN A CACHE MEMORY

[75] Inventors: Joel Abraham Silberman, Somers, N.Y.; Sang Hoo Dhong, Austin, Tex.

[73] Assignee: International Business Machines Corporation, Armonk, N.Y.

[21] Appl. No.: 09/039,516

[22] Filed: Mar. 16, 1998

[51] Int. Cl.$^7$ .................................................. G06F 12/00
[52] U.S. Cl. ............................ 711/108; 365/49; 711/208; 711/220
[58] Field of Search ...................................... 711/108, 208, 711/220; 365/49; 708/709, 710, 708, 714

[56] References Cited

U.S. PATENT DOCUMENTS

| | | | |
|---|---|---|---|
| 4,730,266 | 3/1988 | Meerbergen et al. | 708/711 |
| 5,600,583 | 2/1997 | Bosshart et al. | 708/525 |
| 5,619,446 | 4/1997 | Yoneda et al. | 365/49 |
| 5,644,521 | 7/1997 | Simpson | 708/525 |
| 5,812,521 | 9/1998 | Levenstein et al. | 708/701 |
| 5,875,121 | 2/1999 | Yetter | 365/195 |

OTHER PUBLICATIONS

Heal et al., "64–KByte Sum–Addressed–Memory Cache with 1.6–ns Cycle and 2.6–ns Latency" IEEE Journal of Solid State Circuits, vol. 33, No. 11, pp. 1682–1689, Nov. 1998.

Hang et al., "Leading–Zero Anticipatory Logics for Fast Floating Addition with Carry Propagation Signal", IEEE Transactions, pp. 385–388, 1997.

Cortadella et al., "Evaluation of A+B=K Conditions without Carry Propagation", IEEE Transactions on Computers, vol. 41, No. 11, pp. 1484–1488, Nov. 1992.

Cortadella et al., "Evaluating 'A+B=K' Conditions in Constant Time", IEEE Transactions on Computers, pp. 243–246, 1988.

D. J. Kinniment, "An Evaluation of Asynchronous Addition", IEEE Transactions On Very Large Scale Integration (VLSI) Systems, vol. 4, No. 1, pp. 137–140, Mar. 1996.

Khalid et al., "Digital Design of Higher Radix Quaternary Carry Free Parallel Adder", IEEE Transactions, pp. 187–189, 1997.

Lee Et Al., "Address Addition and Decoding Without Carry Propagation," IEICE Trans. Inf. & System, vol. E80–D, No. 1, Jan. 1997; pp. 98–100.

*Primary Examiner*—John W. Cabeca
*Assistant Examiner*—Pierre-Michel Bataille
*Attorney, Agent, or Firm*—Casimer K. Salys; Felsman, Bradley, Vaden, Gunter & Dillon, LLP

[57] ABSTRACT

A method and apparatus for translating an effective address to a real address within a cache memory are disclosed. As disclosed, a content-addressable memory contains a multiple of addresses, and each of these addresses is individually associated with a unique tag. The content-addressable memory also includes an input circuit, a logic circuit, and an output circuit. The input circuit is for receiving a first number and a second number that are utilized to access the content-addressable memory. The logic is circuit is for determining whether or not there is a match between one of the tags and the two numbers, in accordance with a mismatch expression. The output circuit is for generating an address associated with a tag which matches the two numbers, in accordance with the mismatch expression.

9 Claims, 4 Drawing Sheets

METHOD AND APPARATUS FOR TRANSLATING AN EFFECTIVE ADDRESS TO A REAL ADDRESS WITHIN A CACHE MEMORY

RELATED PATENT APPLICATION

This patent application is related to a copending application U.S. Ser. No. 08/716,817 filed on Sep. 16, 1996 entitled "CONTENT ADDRESSABLE MEMORY ACCESSED BY THE SUM OF TWO OPERANDS" (IBM Docket No. AA9-96-065), the contents of which are incorporated herein by reference.

BACKGROUND OF THE INVENTION

1. Technical Field

The present invention relates to a method and apparatus for data processing in general, and in particular to a method and apparatus for address translation within a cache memory. Still more particularly, the present invention relates to a method and apparatus for translating an effective address into a real address within a cache memory.

2. Description of the Prior Art

In a typical data processing system, an access to a system memory usually involves a computation of an effective address via a summation of two numbers. For a data access, the two numbers may be, for example, a base address of a data array and an offset from the base address of the data array to the required data. For an instruction fetch, the two numbers may be, for example, an address of a current instruction and a relative displacement to the current instruction.

By the same token, an access to a cache memory also involves a computation of an effective address by summing two numbers. The computed effective address is then translated to a real address for a true cache "hit" verification. Because the translation of an effective address to a real address may take several processor clock cycles, various cache related mechanisms such as a Segment Lookaside Buffer (SLB) and a Translation Lookaside Buffer (TLB) are utilized to speed up the translation process. To further improve the translation process, many cache designs employ a content-addressable memory (CAM) to store multiple pairs of effective address and real address. The CAM is searched by simultaneously comparing the computed effective address against all stored effective addresses. If a match occurs, the corresponding real address stored together with the matched effective address is read from the CAM for a true cache "hit" verification.

Figure 1:
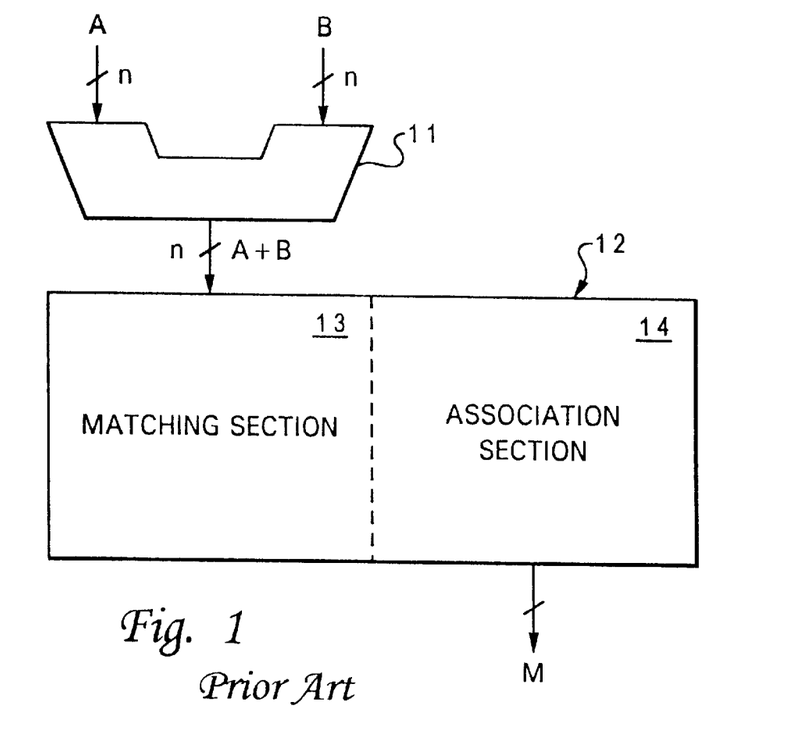
FIG. 1 is a block diagram of an adder for generating an effective address to access a CAM and the CAM itself, according to the prior art.

Referring now to the drawings and in particular to FIG. 1, there is depicted a block diagram of an adder for generating an effective address to access a CAM, according to the prior art. As shown, two n-bit numbers A and B are added by an n-bit adder 11 to produce an n-bit sum A+B. The n-bit sum A+B is then supplied to a CAM 12 for comparison. If a match occurs within a matching section 13 of CAM 12, a corresponding data entry, such as a real address, within an association section 14 of CAM 12 will be output as M.

One problem associated with the prior art configuration for producing an output M is that adder 11 requires a significant amount of processor clock-cycle time to produce a sum A+B, resulting in additional latency for a cache access. Consequently, it would be desirable to provide an improved method and apparatus for translating an effective address into a real address within a cache memory such that the latency associated with a cache access can be reduced.

SUMMARY OF THE INVENTION

In view of the foregoing, it is therefore an object of the present invention to provide an improved method and apparatus for data processing.

It is another object of the present invention to provide an improved method and apparatus for address translation within a cache memory.

It is yet another object of the present invention to provide an improved method and apparatus for translating an effective address into a real address within a cache memory.

The present invention achieves the foregoing objects by combining the steps of address addition and comparison in order to reduce the latency of a cache memory access. In accordance with a preferred embodiment of the present invention, a content-addressable memory contains multiple addresses, and each of these addresses is individually associated with a unique tag. The content-addressable memory also includes an input circuit, a Logic circuit, and an output circuit. The input circuit is for receiving a first number and a second number that are utilized to access the content-addressable memory. The logic circuit is for determining whether or not there is a match between one of the tags and the sum of the two numbers, in accordance with a mismatch expression. The output circuit is for generating an address associated with a tag which matches the sum of the two numbers, in accordance with the mismatch expression.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

In the following description, numerous specific details are set forth to provide an exemplary embodiment of the present invention; however, it will be obvious to those skilled in the art that the present invention may be practiced with other embodiments. In addition, well-known circuits have been shown in block diagram form in order not to obscure the present invention with unnecessary details. Furthermore, details concerning timing considerations and the like have been omitted inasmuch as such details are not necessary to obtain a complete understanding of the present invention and are within the skills of those ordinarily skilled in the relevant art.

In order to facilitate the translation of an effective address to a real address, the steps of performing an addition and a comparison can be recast as a step of determining whether or not A+B−K=0, where A, B are two numbers utilized to access a content-addressable memory (CAM) and K is a tag stored within the CAM. With two's complement n-bit numbers, A+B−K=0 becomes A+B+$\overline{K}$=−1, where $\overline{K}$ is the two's complement of K. Then, an n-bit carry-save adder can be utilized to reduce A+B+$\overline{K}$ to an n-bit sum S and an n-bit carry C, satisfying A+B+$\overline{K}$=S +C. At this point, the condition of whether A+B=$\overline{K}$ can be determined by testing whether S+C=−1 (an n-bit vector of all 1's), or whether S=$\overline{C}$. This procedure forms the basis of an effective address translation within a CAM that is being accessed by two numbers A and B. A more detailed discussion of the above procedure can be founded in Cortadella and Llaberia, *Evaluation of A+B=K Conditions Without Carry Propagation*, IEEE Trans. Comput., vol. 41, no. 11, pp. 1484–1488 (1992); Parhami, *Comments on Evaluation of A+B=K Conditions Without Carry Propagation*, IEEE Trans. Comput., vol. 43, no. 4, p. 381 (1994); and, Lee and Hwang, *Address Addition and Decoding without Carry Propagation*, IEICE Trans. Inf. & Syst., vol. E80-D. no. 1, p. 98 (1'397), all of which are incorporated herein by reference.

The utilization of a carry-save adder to produce S and C instead of performing a full addition of A and B greatly speeds up the entire address translation process. With K stored within the CAM, however, it is still too "expensive" (in terms of operational speed and silicon area) to duplicate a carry-save adder for each bit of each entry within the CAM in order to determine whether or not A+B+$\overline{K}$=−1. Instead, the above procedure can be modified as follows such that a relatively small CAM will be sufficient.

Without any modification, the above procedure requires an $i^{th}$ carry-save adder to take inputs $A_i$, $B_i$ and $\overline{K}_i$ for producing $S_i$ and $C_i$. Because it is typically more efficient for a CAM to determine an occurrence of a mismatch between an input and stored data than to determine for a match, the above procedure is modified to test for an inequality (mismatch) instead. The test for inequality is given by $\overline{S_i \oplus C_{i+1}}$ (complement of XOR of $S_i$ and $C_{i+1}$). Hence, the key to an effective address translation within a CAM being accessed by numbers Ai and B. is to recast the logical expression for a mismatch in a single bit $Z_i=\overline{S_i \oplus C_{i+1}}$ in a suitable form. In other words, from $$A_i + B_i + \overline{K}_i = S_i + C_i,$$

$$S_i = A_i \oplus B_i \oplus \overline{K}_i = K_i \cdot (A_i \oplus B_i) \lor \overline{K}_i \cdot \overline{(A_i \oplus B_i)}, \text{ and}$$

an expression for $Z_i=\overline{S_i \oplus C_{i+1}}$ can be derived in the form of $$C_i = A_i \cdot B_i \lor \overline{K}_i \cdot (A_i \lor B_i),$$

$$Z_i = K_i \cdot K_{i+1} \cdot M_{11}^i \lor K_i \cdot \overline{K}_{i+1} \cdot M_{10}^i \lor \overline{K}_i \cdot K_{i+1} \cdot M_{01}^i \lor \overline{K}_i \cdot \overline{K}_{i+1} \cdot M_{00}^i$$

where $$M_{00}^i = \overline{(A_i \oplus B_i)} \cdot (A_{i+1} \lor B_{i+1}) \lor (A_i \oplus B_i) \cdot (\overline{A}_{i+1} \cdot \overline{B}_{i+1}),$$

$$M_{01}^i = (A_i \oplus B_i) \cdot (\overline{A}_{i+1} \cdot \overline{B}_{i+1}) \lor \overline{(A_i \oplus B_i)} \cdot (A_{i+1} \cdot B_{i+1}),$$

$$M_{10}^i = (A_i \oplus B_i) \cdot (A_{i+1} \lor B_{i+1}) \lor \overline{(A_i \oplus B_i)} \cdot (\overline{A}_{i+1} \cdot \overline{B}_{i+1}), \text{ and}$$

$$M_{11}^i = \overline{(A_i \oplus B_i)} \cdot (\overline{A}_{i+1} \lor \overline{B}_{i+1}) \lor (A_i \oplus B_i) \cdot (A_{i+1} \cdot B_{i+1}).$$

During operation, a comparison circuit within each CAM cell computes a mismatch signal for a bit i utilizing four $M^i_{jk}$ inputs and both bits i and i+1 of a stored entry K. The mismatch signal, $Z_i$, is then computed and subsequently paired with the mismatch signals from all bits of the entry K to determine if any bit mismatches. This formulation will result in two 1's and two 0's for a $M^i_{jk}$ of each bit. This is depicted in Table I which provides the value of $M^i_{jk}$ for all possible input values of $A_i$, $A_{i+1}$, $B_i$ and $B_{i+}$.

Notice that in Table I, although the Boolean equations for $M^i_{jk}$ have the property of two "1"s and two "0"s for a $M^i_{jk}$ of each bit, not all pairings of $M^i_{jk}$ with both ,"1"s are possible. In fact, only four combinations exist that have both $M^i_{jk}$ simultaneously as "1"s. By recognizing this property, the present invention generates a new set of four signals in which only one of the four signals is a "1" at any given time.

TABLE I

| $A_i$ | $A_{i+1}$ | $B_i$ | $B_{i+1}$ | $M_{00}^i$ | $M_{01}^i$ | $M_{10}^i$ | $M_{11}^i$ |
|---|---|---|---|---|---|---|---|
| 0 | 0 | 0 | 0 | 0 | 0 | 1 | 1 |
| 0 | 0 | 0 | 1 | 1 | 0 | 0 | 1 |
| 0 | 0 | 1 | 0 | 1 | 1 | 0 | 0 |
| 0 | 0 | 1 | 1 | 0 | 1 | 1 | 0 |
| 0 | 1 | 0 | 0 | 1 | 0 | 0 | 1 |
| 0 | 1 | 0 | 1 | 1 | 1 | 1 | 0 |
| 0 | 1 | 1 | 0 | 0 | 1 | 1 | 0 |
| 0 | 1 | 1 | 1 | 0 | 0 | 1 | 1 |
| 1 | 0 | 0 | 0 | 1 | 1 | 0 | 0 |
| 1 | 0 | 0 | 1 | 0 | 1 | 1 | 0 |
| 1 | 0 | 1 | 0 | 0 | 0 | 1 | 1 |
| 1 | 0 | 1 | 1 | 1 | 0 | 0 | 1 |
| 1 | 1 | 0 | 0 | 0 | 1 | 1 | 0 |
| 1 | 1 | 0 | 1 | 0 | 0 | 1 | 1 |
| 1 | 1 | 1 | 0 | 1 | 0 | 0 | 1 |
| 1 | 1 | 1 | 1 | 1 | 1 | 0 | 0 |

Thus, according to a preferred embodiment of the present invention, various combinations of $M^i_{jk}$ are designated $X_a$, $X_b$, $Y_a$, and $Y_b$, as follows:

$$X_a^i = M_{00}^i \cdot M_{01}^i$$

$$X_b^i = M_{10}^i \cdot M_{11}^i$$

$$Y_a^i = M_{11}^i \cdot M_{00}^i$$

$$Y_b^i = M_{10}^i \cdot M_{01}^i$$

Accordingly, the corresponding Boolean expressions for an $i^{th}$ bit of the output of the new conditioning logic with inputs $A_i$ and $B_i$ becomes:

$$X_a^i = (A_i \oplus B_i) \cdot (\overline{A}_{i+1} \cdot \overline{B}_{i+1}) \lor \overline{(A_i \oplus B_i)} \cdot (A_{i+1} \cdot B_{i+1}),$$

$$X_b^i = (A_i \oplus B_i) \cdot (A_{i+1} \cdot B_{i+1}) \lor \overline{(A_i \oplus B_i)} \cdot (\overline{A}_{i+1} \cdot \overline{B}_{i+1}),$$

$$Y_a^i = \overline{(A_i \oplus B_i)} \cdot (A_{i+1} \oplus B_{i+1}), \text{ and}$$

$$Y_b^i = (A_i \oplus B_i) \cdot (A_{i+1} \oplus B_{i+1}).$$

Hence, the expression for a mismatch in a single bit i of a CAM entry $K_i$ becomes $$Z^i = (K_i \cdot X_b^i) \lor (\overline{K}_i \cdot X_a^i) \lor (K_i \oplus K_{i+1}) \cdot Y_b^i \lor \overline{(K_i \oplus K_{i+1})} \cdot Y_a^i.$$

Thus, if $X_b^i$ is a "1" (i.e., true), then the binary sum of $A_i$ and $B_i$ has a "0" in this bit position and will mismatch any entry $K_i$ that has a "1." Similarly, if $X_a^i$ is a "1," then the binary sum of A and B has a "1" in this bit and will mismatch an entry $K_i$ that has a "0." Also, if $Y_b^i$ is a "1," the binary sum of $A_i$ and $B_i$ is the same as the value at position i+1, then this binary sum will mismatch any entry in which bit i differs from bit i+1. A complementary interpretation holds for $Y_a^i$.

The present invention has two distinct advantages over the approach described in the previous patent application. Because the present invention utilizes a set of four signals per bit of which only one signal is a "1", whereas the previous approach utilizes four signals per bit, two of which are "1's", the current approach saves power. A second advantage of the present invention over the previous approach is that fewer memory cells are needed for entry K. The previous approach formed the mismatch signal for bit i from the four values $K_i \cdot K_{i+1}$, $K_i \cdot \overline{K}_{i+1}$, $\overline{K}_i \cdot K_{i+1}$, and $\overline{K}_i \cdot \overline{K}_{i+1}$. This requires four memory cells for storage. The current approach utilizes $K_i$ and $\overline{K}_i$ as well as $K_i \oplus K_{i+1}$ and $\overline{K_i \oplus K_{i+1}}$. Since a single memory cell can source both a signal and its complement, only two cells are needed by the present invention. The circuitry needed to perform and AND operation between all stored CAM values with the $X_a^i$, $X_b^i$, $Y_a^i$, $Y_b^i$ inputs remains unchanged from the related patent application.

Figure 2:
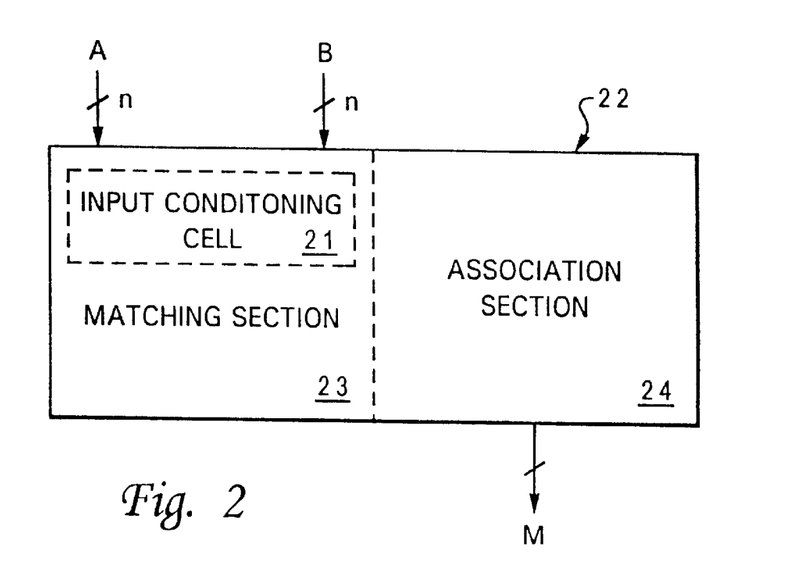
FIG. 2 is a block diagram of a CAM capable of producing a translated address, in accordance with a preferred embodiment of the present invention.

With reference now to FIG. 2, there is depicted a block diagram of a CAM capable of producing a translated address, in accordance with a preferred embodiment of the present invention. As shown, CAM 22 includes an input conditioning cell 21, a matching section 23, and an association section 24. For a cache access, two n-bit numbers A and B are initially supplied to input conditioning cell 21 of CAM 22. Subsequently, if a match occurs within matching section 23, a corresponding data entry, such as a real address, within association section 24 will be output as M.

Figure 3:
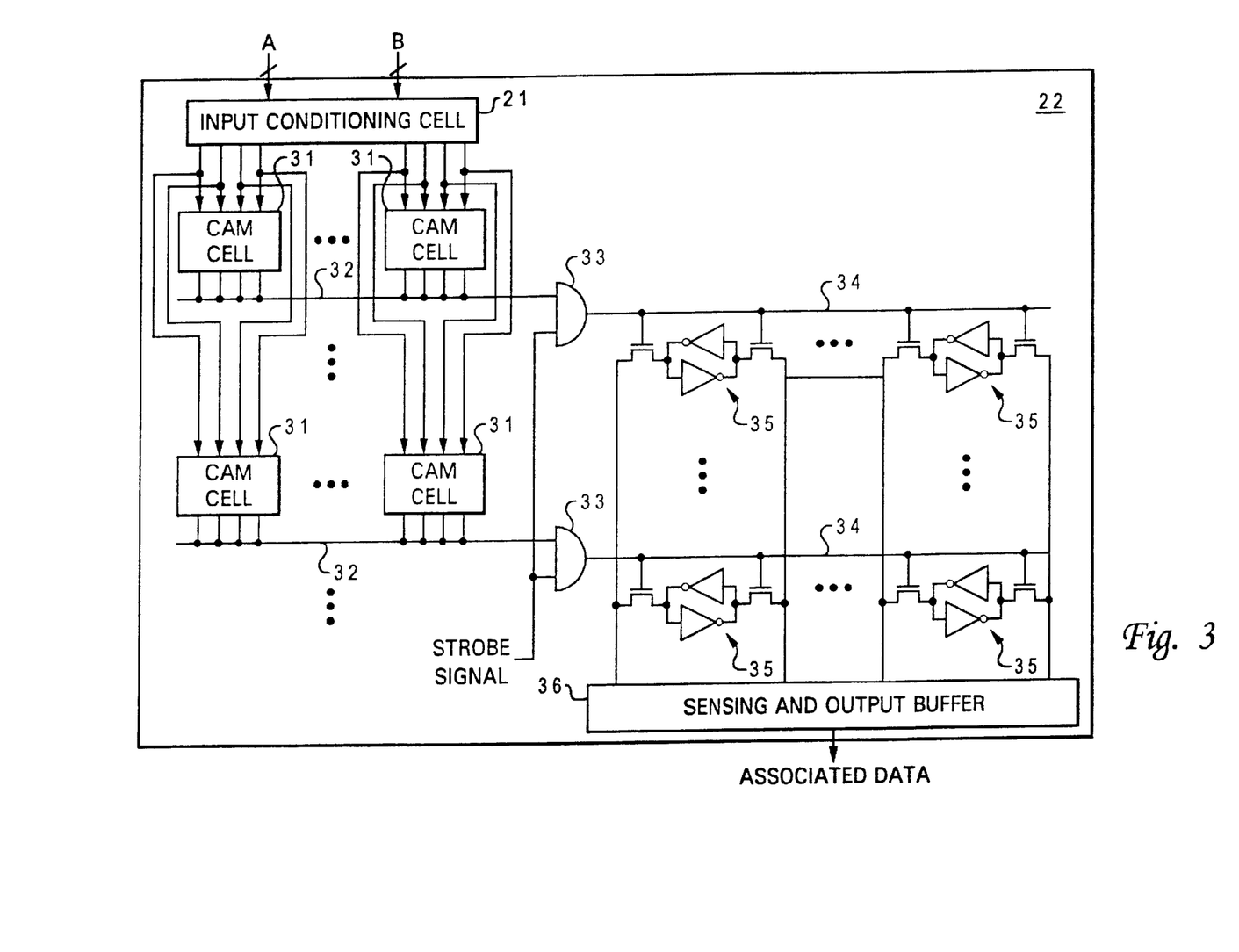
FIG. 3 is a detailed block diagram of the CAM from FIG. 2, in accordance with a preferred embodiment of the present invention.

Referring now to FIG. 3, there is illustrated a detailed block diagram of CAM 22 in accordance with a preferred embodiment of the present invention. An input conditioning cell 21 is coupled to several CAM cells 31. These CAM cells 31 represent the matching section of FIG. 2. Each of CAM matchlines 32 from corresponding CAM cells 31 is coupled to an input of a two-input AND gate 33. The other input of two-input AND gate 33 is connected to a strobe signal. The outputs of these two-input AND gates 33 are wordlines 34 for accessing a corresponding row of memory cells 35. Should any one CAM matchline 32 have a "high" signal, then the corresponding AND gate 33 will output an asserted or "high" signal onto the connected wordline 34, which will result in the output from corresponding memory cells 35 into a sensing and output buffer 36. An associated datum will then be output via sensing and output buffer 36.

Figure 4:
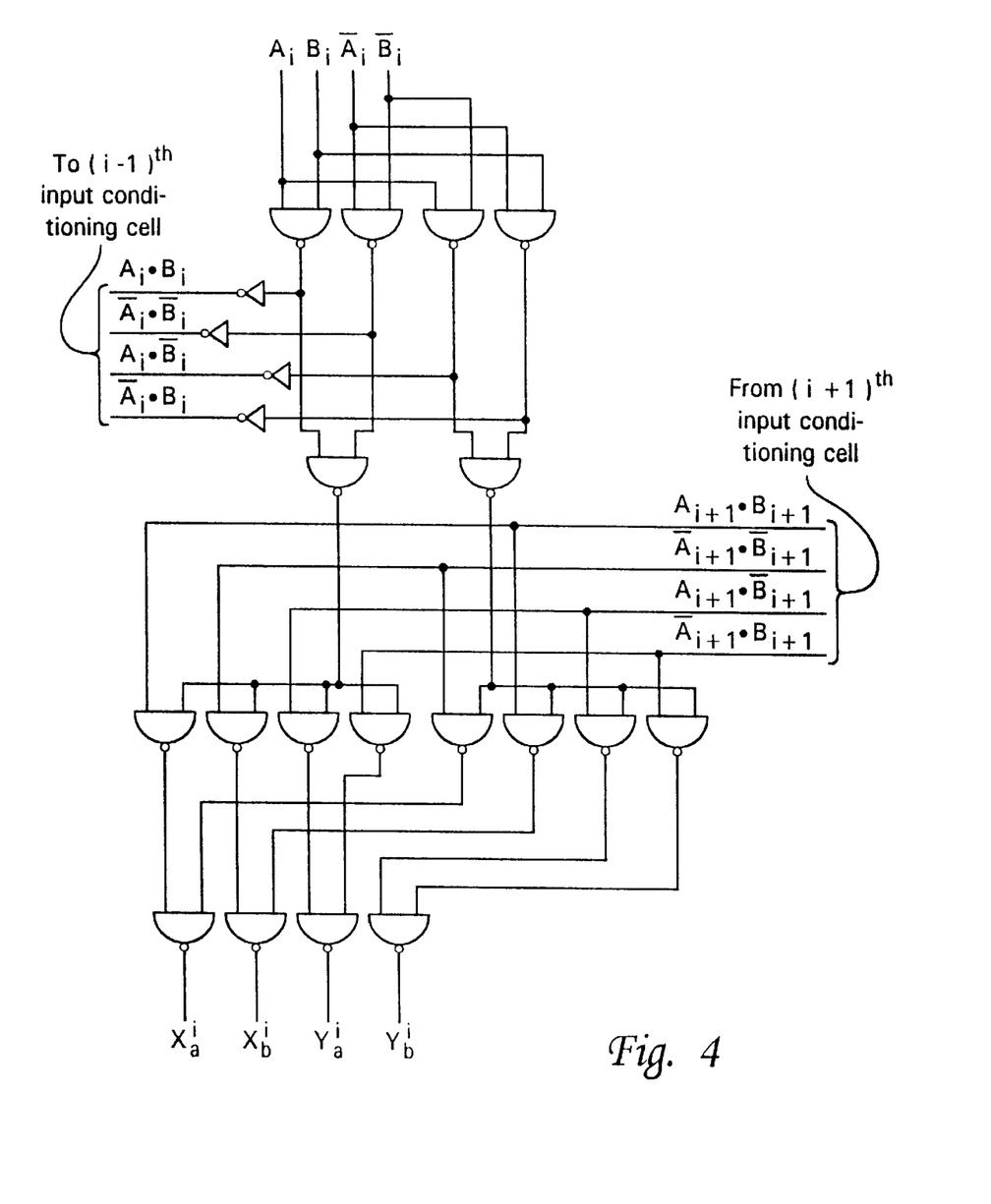
FIG. 4 is a detailed logic circuit diagram of the input conditioning cell from FIG. 3, in accordance with a preferred embodiment of the present invention.

With reference now to FIG. 4, there is depicted a detailed logic circuit diagram of the input conditioning cell from FIG. 3, in accordance with a preferred embodiment of the present invention. This is only an exemplary arrangement of logic gates for generating $X_a^i$, $X_b^i$, $Y_a^i$, $Y_b^i$ from inputs $A_i$ and $B_1$; and it is understood to those skilled in the relevant art that other arrangements are also possible to achieve similar results.

Figure 5:
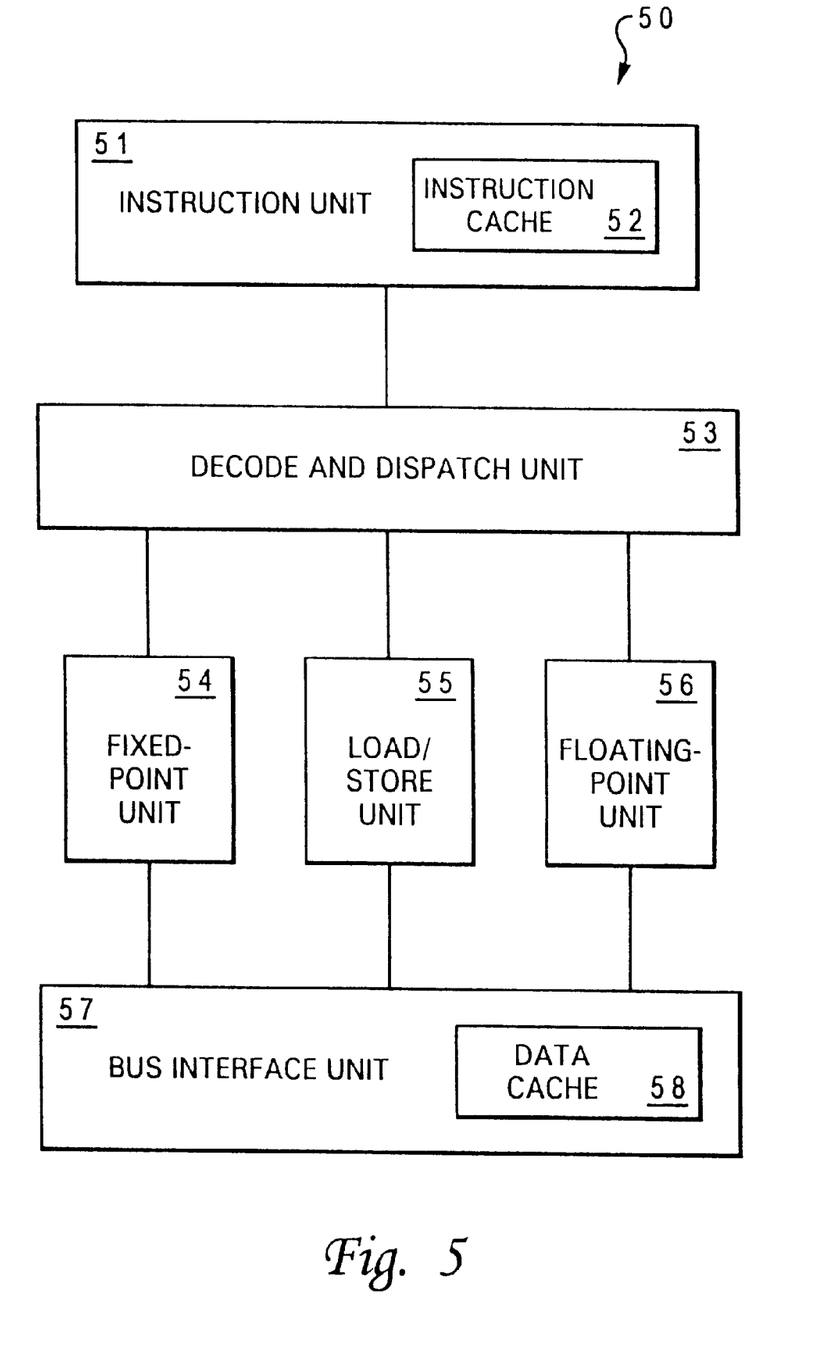
FIG. 5 is a block diagram of a typical processor in which a preferred embodiment of the present invention may be implemented.

Referring now to FIG. 5, there is illustrated a block diagram of a typical processor in which a preferred embodiment of the present invention may be implemented. As shown, processor 50 includes an instruction unit 51 with an instruction cache 52, a decode and dispatch unit 53, a fixed-point unit 54, a load/store unit 55, a floating-point unit 56, and a bus interface unit 57 with a data cache 58. The functional blocks as shown are common within processors such as the PowerPC™ family manufactured by International Business Machines Corporation. Any one or both caches 52 and 58 may be implemented with a CAM in accordance with a preferred embodiment of the present invention as illustrated.

As has been described, the present invention provides an improved method for translating an effective address into a real address within a cache memory. As far as the CAM cell that holds $K_i$ is concerned, the advantage of the present invention stems from the fact that pairs of terms in the expression for the mismatch of each bit $Z^i$ contain complementary expression involving $K_i$ and $(K_i \oplus K_{i+1})$. Thus, each pair of terms requires only one storage element per cell, resulting in a new comparison cell for the CAM that is smaller (by approximately a factor or two) than the one that was previously disclosed in the related patent application. In addition, because the corresponding pair of redundant inputs that AND with the complementary outputs of a single storage cell are never simultaneously true, a conventional CAM comparison cell can be utilized for each of the two stored values $K_i$, and $(K_i \oplus K_{i+1})$ in each bit.

While the invention has been particularly shown and described with reference to a preferred embodiment, it will be understood by those skilled in the art that various changes in form and detail may be made therein without departing from the spirit and scope of the invention.

What is claimed is:

1. A content-addressable memory comprising:
    address storage for storing each of a plurality of address is association a respective one of a plurality of tags;
    an input circuit for receiving a first number and a second number, wherein said first and second numbers are utilized to access said address storage;
    a logic circuit, coupled to said input circuit, for determining whether or not there is a match between one of said plurality of tags and said first and second numbers in accordance with a mismatch expression, wherein said mismatch expression of a bit i is
    $Z^i = (K_i \cdot X_b^i) V(\overline{K}_i \cdot X_a^i) V(K_i \oplus K_{i+1}) \cdot Y_b^i V \overline{(K_i \oplus K_{i+1})} \cdot Y_a^i$, where $X_a^i = (A_i \oplus B_i) \cdot (\overline{A}_{i+1} \cdot \overline{B}_{i+1}) V \overline{(A_i \oplus B_i)} \cdot (A_{i+1} \cdot B_{i+1})$, $X_b^i = (A_i \oplus B_i) \cdot (A_{i+1} \cdot B_{i+1}) V \overline{(A_i \oplus B_i)} \cdot (\overline{A}_{i+1} \cdot \overline{B}_{i+1})$, $Y_a^i = \overline{(A_i \oplus B_i)} \cdot (A_{i+1} \oplus B_{i+1})$, and $Y_b^i = (A_i \oplus B_i) \cdot (A_{i+1} \oplus B_{i+1})$.

where $A^i$ is said first number, $B^i$ is said second number, and $K^i$ is any one of said plurality of tags; and
    an output circuit, coupled to said logic circuit, for supplying an address associated with a tag which matches said first and second numbers in accordance with said mismatch expression.

2. The content-addressable memory according to claim 1, wherein said content-addressable memory requires two storage elements per cell.

3. The content-addressable memory according to claim 2, wherein said two storage elements are for storing a $K_i$ and $(K_i \oplus K_{i+1})$.

4. A processor, comprising:
    an instruction unit;
    a plurality of execution units, coupled to said instruction unit, for executing instructions from said instruction unit; and
    a content-addressable memory, coupled to said instruction unit, for storing a plurality of addresses, wherein each of said plurality of addresses is associated with a tag, wherein said content-addressable memory includes
        an input circuit for receiving a first number and a second number, wherein said first and second numbers are utilized to access said content-addressable memory;

a logic circuit, coupled to said input circuit, for determining whether or not there is a match between one of said tags arid said first and second numbers in accordance with a mismatch expression, wherein said mismatch expression of a bit i is $$Z^i = (K_i \cdot X_b^i) \vee (\overline{K_i} \cdot X_a^i) \vee (K_i \oplus K_{i+1}) \cdot Y_b^i \vee \overline{(K_i \oplus K_{i+1})} \cdot Y_a^i,$$

where $$X_a^i = (A_i \oplus B_i) \cdot (\overline{A}_{i+1} \cdot \overline{B}_{i+1}) \vee \overline{(A_i \oplus B_i)} \cdot (A_{i+1} \cdot B_{i+1}),$$

$$X_b^i = (A_i \oplus B_i) \cdot (A_{i+1} \cdot B_{i+1}) \vee \overline{(A_i \oplus B_i)} \cdot (\overline{A}_{i+1} \cdot \overline{B}_{i+1}),$$

$$Y_a^i = \overline{(A_i \oplus B_i)} \cdot (A_{i+1} \oplus B_{i+1}), \text{ and}$$

$$Y_b^i = (A_i \oplus B_i) \cdot (A_{i+1} \oplus B_{i+1}),$$

where $A_i$ is said first number, $B_i$ is said second number, and $K_i$ is any one of said plurality of tags; and an output circuit, coupled to said logic circuit, for generating an address associated with a tag which matches said first and second numbers in accordance with said mismatch expression.

5. The processor according to claim 4, wherein said content-addressable memory requires two storage elements per cell.

6. The processor according to claim 5, wherein said two storage elements are for storing a $K_i$ and $(K_i \oplus K_{i+1})$.

7. A method for translating an effective address to a real address within a content-addressable memory in which a plurality of real addresses is stored, wherein each of said plurality of real addresses is associated with a tag, said method comprising the steps of:

receiving a first number and a second number, wherein said first and second numbers are utilized to access said content-addressable memory;

determining whether or not there is a match between one of said tags and said first and second numbers in accordance with a mismatch expression, wherein said mismatch expression of a bit i is $$Z^i = (K_i \cdot X_b^i) \vee (\overline{K_i} \cdot X_a^i) \vee (K_i \oplus K_{i+1}) \cdot Y_b^i \vee \overline{(K_i \oplus K_{i+1})} \cdot Y_a^i,$$

where $$X_a^i = (A_i \oplus B_i) \cdot (\overline{A}_{i+1} \cdot \overline{B}_{i+1}) \vee \overline{(A_i \oplus B_i)} \cdot (A_{i+1} \cdot B_{i+1}),$$

$$X_b^i = (A_i \oplus B_i) \cdot (A_{i+1} \cdot B_{i+1}) \vee \overline{(A_i \oplus B_i)} \cdot (\overline{A}_{i+1} \cdot \overline{B}_{i+1}),$$

$$Y_a^i = \overline{(A_i \oplus B_i)} \cdot (A_{i+1} \oplus B_{i+1}), \text{ and}$$

$$Y_b^i = (A_i \oplus B_i) \cdot (A_{i+1} \oplus B_{i+1}),$$

where $A_i$ is said first number, $B_i$ is said second number, and $K_i$ is any one of said plurality of tags; and generating a real address associated with a tag which matches said first and second numbers in accordance with said mismatch expression.

8. The method according to claim 9, wherein said content-addressable memory requires two storage elements per cell.

9. The method according to claim 8, wherein said two storage elements are for storing a $K_i$ and $(K_i \oplus K_{i+1})$.

* * * * *

UNITED STATES PATENT AND TRADEMARK OFFICE
CERTIFICATE OF CORRECTION

PATENT NO. : 6,088,763
DATED : July 11, 2000
INVENTOR(S) : Silberman et al.

It is certified that error appears in the above-identified patent and that said Letters Patent are hereby corrected as shown below:

Column 3, line 23, please delete "(1'397)" and insert --(1997)--.

Column 3, line 43, please delete "Ai" and insert --$A_i$--.

Column 3, line 43, please delete "B" and insert --$B_i$--.

Column 4, line 5, please delete "$B_{i+}$" and insert --$B_{i+1}$--.

Column 5, line 49, please delete "$X_b^1$" and insert -- $X_b^i$ --.

Column 5, line 50, please delete "$B_1$" and insert --$B_i$--.

Column 6, line 43, please delete "$A^i$" and insert --$A_i$ --.

Column 6, line 43, please delete "$B^i$" and insert --$B_i$--.

UNITED STATES PATENT AND TRADEMARK OFFICE
CERTIFICATE OF CORRECTION

Page 2 of 2

PATENT NO. : 6,088,763
DATED : July 11, 2000
INVENTOR(S) : Silberman, et al.

It is certified that error appears in the above-identified patent and that said Letters Patent is hereby corrected as shown below:

Column 6, line 44, please delete "$K^i$" and insert --$K_i$--.

Signed and Sealed this

Seventeenth Day of April, 2001

Attest:

NICHOLAS P. GODICI

Attesting Officer

Acting Director of the United States Patent and Trademark Office